(12) United States Patent
Bukhamseen et al.

(10) Patent No.: US 10,908,007 B1
(45) Date of Patent: Feb. 2, 2021

(54) MULTIPHASE FLOW METERING SYSTEM FOR HORIZONTAL WELL COMPARTMENTS

(71) Applicant: Saudi Arabian Oil Company, Dhahran (SA)

(72) Inventors: Ahmed Y. Bukhamseen, Dammam (SA); Brett W. Bouldin, Dhahran (SA); Robert John Turner, Dhahran (SA); Moataz Abu AlSaud, Khobar (SA)

(73) Assignee: Saudi Arabian Oil Company, Dhahran (SA)

(*) Notice: Subject to any disclaimer, the term of this patent is extended or adjusted under 35 U.S.C. 154(b) by 0 days.

(21) Appl. No.: 16/545,678

(22) Filed: Aug. 20, 2019

(51) Int. Cl.
| | | |
|---|---|---|
| *G01F 5/00* | (2006.01) | |
| *E21B 47/047* | (2012.01) | |
| *E21B 47/06* | (2012.01) | |
| *E21B 47/10* | (2012.01) | |
| *G01F 23/26* | (2006.01) | |

(52) U.S. Cl.
CPC .............. *G01F 5/005* (2013.01); *E21B 47/06* (2013.01); *E21B 47/10* (2013.01); *G01F 23/263* (2013.01)

(58) Field of Classification Search
None
See application file for complete search history.

(56) References Cited

U.S. PATENT DOCUMENTS

| | | |
|---|---|---|
| 3,705,626 A | 12/1972 | Glenn, Jr. et al. |
| 3,938,910 A | 2/1976 | Douglas |
| 5,574,263 A | 11/1996 | Roesner |
| 6,629,564 B1 * | 10/2003 | Ramakrishnan ........ E21B 47/10 166/250.07 |
| 6,719,048 B1 | 4/2004 | Ramos et al. |
| 6,831,470 B2 | 12/2004 | Xie et al. |
| 6,993,979 B2 | 2/2006 | Segeral |
| 7,908,930 B2 | 3/2011 | Xie et al. |
| 9,116,105 B2 | 8/2015 | Veneruso et al. |
| 2014/0110105 A1 | 4/2014 | Jones et al. |
| 2014/0136125 A1 | 5/2014 | Agar et al. |
| 2016/0097273 A1 * | 4/2016 | Xia ....................... E21B 47/103 73/152.33 |
| 2018/0231498 A1 * | 8/2018 | Amir ....................... G01F 1/661 |
| 2018/0347338 A1 | 12/2018 | Abbad et al. |
| 2018/0348035 A1 | 12/2018 | Huang |

FOREIGN PATENT DOCUMENTS

| | | |
|---|---|---|
| EP | 0683304 A2 | 11/1995 |
| WO | 2001022041 A1 | 3/2001 |
| WO | 2012000655 A1 | 1/2012 |
| WO | 2013005091 A2 | 1/2013 |

OTHER PUBLICATIONS

International Search Report and Written Opinion in Corresponding PCT Application No. PCT/US2020/046890 dated Nov. 9, 2020. 13 pages.

* cited by examiner

*Primary Examiner* — Harshad R Patel
(74) *Attorney, Agent, or Firm* — Leason Ellis LLP (57) ABSTRACT

A method of measuring two or more fluid phases in a downhole well bore that comprises measuring a flow of each of the two or more phases at respective ports at which the two or more phases are unmixed within the well bore. In certain implementations, the well bore is inclined at 20 degrees or less to a horizontal axis. Each of the two or more phases can flow at a rate to achieve low Reynolds numbers in a laminar flow regime.

13 Claims, 5 Drawing Sheets

MULTIPHASE FLOW METERING SYSTEM FOR HORIZONTAL WELL COMPARTMENTS

FIELD OF THE DISCLOSURE

The present disclosure relates to oil and gas exploration and production, and, more particularly, relates to a multiphase flow metering system for a horizontal well compartment and associated method of multiphase flow metering.

BACKGROUND OF THE DISCLOSURE

In oil and gas production, it is often useful to measure the amount of fluid flowing in various parts of the infrastructure. For example, flow measurement can be used to monitor the performance of multizonal horizontal wells and the real-time measurement of water flow, which allows production engineers to plan immediate remedial action. Multiphase flow is fluid flow that includes two or more components, referred to as phases. In the oil and gas field, the multiphase flow typically consists of oil and water, oil and gas, or oil, gas and water. Measurement of the total mass fluid flow does not necessarily provide useful information concerning the flow of each of the distinct phase components, which is often desired.

Conventional two-phase flow meters typically use several sensors and process the sensor data with algorithms to interpret complex flows. One of the common methods to measure the flow rate downhole employs a Venturi to measure mass single-phase flow. To obtain the phase fraction in two-phase flow, the Venturi is coupled with another sensor to accurately measure density. By design, the Venturi creates enough pressure drop to generate well-mixed flow. However, mixing the fluids can create further complications such as emulsions, erosion, and additional pressure drops. Other techniques that measure flows by separating or stratifying the phases employ cumbersome separation devices and are not optimized for sensing and the phase levels in a horizontal well.

It would therefore be advantageous to provide a system and method for multiphase flow metering in a horizontal well compartment that avoids the complexities of fluid mixing and is optimized for horizontal wells.

SUMMARY OF THE DISCLOSURE

Disclosed herein is a method of measuring two or more fluid phases of in a downhole well bore that comprises measuring a flow of each of the two or more phases at respective ports at which the two or more phases are unmixed within the well bore.

In certain implementations, the well bore is inclined at 20 degrees or less to a horizontal axis. Each of the two or more phases can flow at a rate to achieve low Reynolds numbers in a laminar flow regime.

In certain implementation, the two or more phases mix downstream from the respective ports.

In certain embodiments, the method further includes immersing level sensors within the two more fluid phases.

In certain embodiments, the method further includes measuring the pressure of the two or more phases at the respective ports.

In certain embodiments, the method further includes coupling a variable valve having an opening to each respective port used to measure each of the separate two or more phases. The opening of variable valves can be controlled to maintain separation of the two or more flowing phases during an entire production period.

In certain embodiments, the method further includes determining a flow rate of the two or more phases based on pressure at the respective ports according to the equation:

$$Q_i = C_{V_i} \sqrt{\frac{\Delta p}{\rho_i}}$$

in which Qi is the flow rate of the ith phase, $C_{vi}$ is a coefficient related to the properties of the variable valve of the ith variable valve, $\Delta p$ is a pressure differential measured at the ith port, $\rho_1$ is the density of the ith phase, and in which the two or more phases number 1 to i.

Also disclosed herein is a system for measuring two or more fluid phases in a downhole well bore that comprises a plurality of sensors, one of the plurality of sensors measuring a flow in each one of the two or more phases at respective offtake points at which the two or more phases are unmixed within the well bore. In certain implementations, the plurality of sensors comprises plural pressure sensors.

In certain embodiments, the system further includes a plurality of level sensors, one of the plurality of level sensors being immersed in each one of the respect two or more phases.

In certain embodiments, the system further includes a plurality of valves for controlling inflow so as to maintain an interface level between the at least two phases.

In certain implementations, the well bore is inclined at 20 degrees or less to a horizontal axis. Each of the two or more phases can flow at a rate to achieve low Reynolds numbers in a laminar flow regime.

In certain implementations, the two or more phases mix downstream from the respective ports.

These and other aspects, features, and advantages can be appreciated from the following description of certain embodiments of the disclosure and the accompanying drawing figures and claims.

DETAILED DESCRIPTION OF CERTAIN EMBODIMENTS OF THE DISCLOSURE

Systems and methods for measuring two-phase flow (i.e., flow including two components such as water and oil) in downhole well compartments are disclosed herein. The two-phase flow arrives in an unmixed state or is separated into its components and stratified (into top and bottom portions) inside a horizontal well compartment. In either case, the phases are maintained in an unmixed state within the horizontal well compartment. The well compartment apparatus includes tubing having flow ports arranged to permit flow from the annulus surrounding the tubing. One set of ports is permeated by one of the two phases, while another set of ports is permeated by the other phase, allowing the flow of each phase to be measured separately. The level of the interface between the stratified phases is maintained using level sensors and adjustable valves that control the flow from the annulus into to the production tubing.

The flows are stratified to facilitate flow measurement because determining flow rates in a mixed, multiphase flow is considerably more complex. In embodiments of the system, differential pressure gauges such as Venturi devices can be used to measure the two single-phase flows; one differential pressure gauge can be positioned in each layer in the stratified flow. As each phase flows through an inflow orifice, the pressure drop across that orifice is measured. The phase fraction of either component can then be calculated by accumulating the phase volume flow over a period and dividing it by the total fluid volume.

Experiments and mathematical modelling including computation fluid dynamic analyses, show that under most prevalent conditions, flow tends to stratify in the horizontal well compartment without needing additional stratification elements or techniques. Table 1 below includes typical fluid properties used in computation fluid dynamics analyses. Table 2 below details several cases in which different flow parameters for oil and water were tested.

TABLE I (fluid properties)

| Surface tension (N/in) | Viscosity (water/oil) (cP) | Density (water/oil) (kg/m3) | Diameter (m) | Concentric internal diameter (m) | Pipe length (m) |
|---|---|---|---|---|---|
| 0.01 | 1/0.8 | 1000/800 | 0.15 | 0.11 | 2.5 |

TABLE II

Tests with varying flow parameters)

| | Annulus Inlet velocities (water/oil) (m/s) | Compartment Flow rate (BPD) | Reynolds number | Froude number |
|---|---|---|---|---|
| Case 1 | 0.08/0.02 | 500 | 7,000 | 0.06 |
| Case 2 | 0.16/0.04 | 1,000 | 14,000 | 0.12 |
| Case 3 | 1.5/0.25 | 8,500 | 130,000 | 0.7 |
| Case 4 | 2.4/0.4 | 13,500 | 210,000 | 1.2 |

In the computation fluid dynamics analyses, in cases 1 and 2, the velocities were set at typical inlet and compartment flow rates. In cases 3 and 4 the inlet and compartment flow rate parameters were set at very high levels, representing "worst case" scenarios. The analyses calculated the Froude number, which is a dimensionless parameter that is defined as the ratio of the fluid inertia to the external field, typically gravity. Generally, for a multiphase fluid, a Froude number below 1.0 implies that gravity dominates fluid inertia, and that the fluid will tend to separate into its components and stratify at low to medium velocities. Froude numbers above but near 1.0 are representative of a "wavy stratified" flow regime. The results of the analyses demonstrate that at the typical inlet and compartmental flow velocities, the Froude number is considerably below 1 and that the fluid can be expected to stratify up to 8,500 BPD (barrels per day). At a flow rate of 10,000 BPD, which represents a top expected flow rate, the wavy stratified regime begins. In sum, the analyses show that stratification can be expected to occur without large waves through the entire range of expected flow rates. The systems and methods for metering multiphase flow disclosed herein are based upon these robust findings.

Figure 4A:
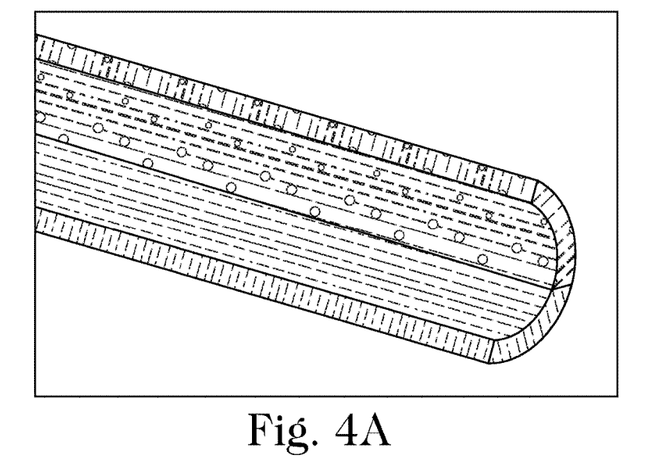
FIGS. 4A to 4D illustrate flow regimes at different flow rates for stratified two-phase flow in a horizontal compartment.
Figure 4B:
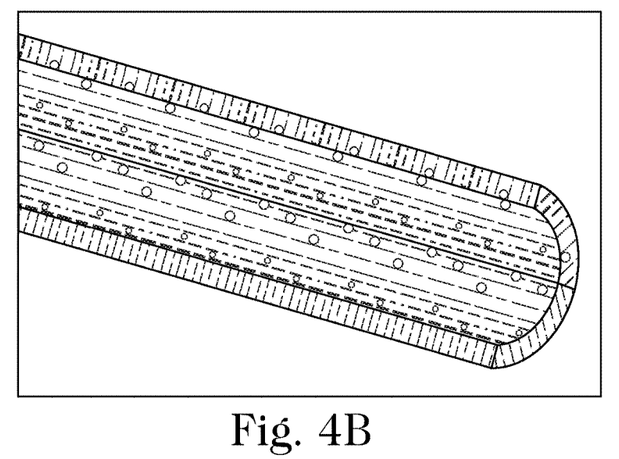
Figure 4C:
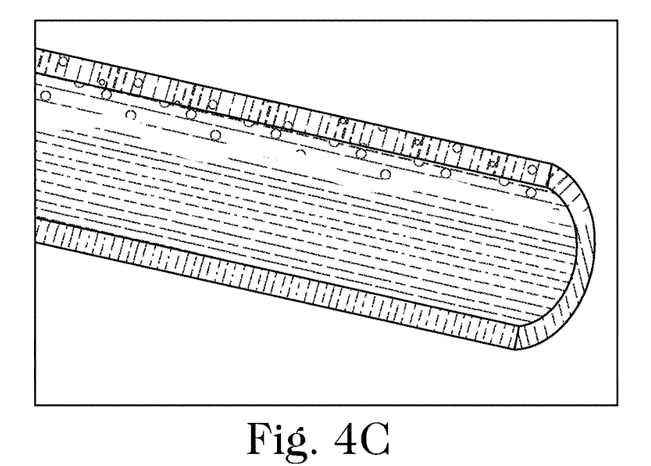
Figure 4D:
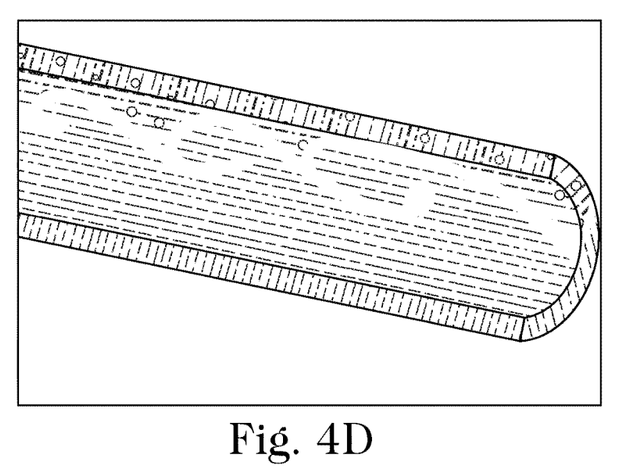

FIGS. 4A through 4D illustrate multiphase flow through a horizontal compartment at different flow rates. FIG. 4A and FIG. 4B illustrate flow at 500 BPD and 1000 BPD, respectively. As illustrated, the phases of oil and water are stratified, and the flow of the phases is not wavy. As shown in FIG. 4C, at a flow rate of 8500 BPD, while the flow remains stratified, the interface between the oil and water is uneven, indicating the start of wavy flow. At 13,500, shown in FIG. 4D, there are significant waves and turbulence in the water phase. As noted, flow rates in the horizontal compartment are expected to remain within the ranges depicted in FIGS. 4A-4C, and the unstable flow shown in FIG. 4D is highly unlikely.

Figure 1:
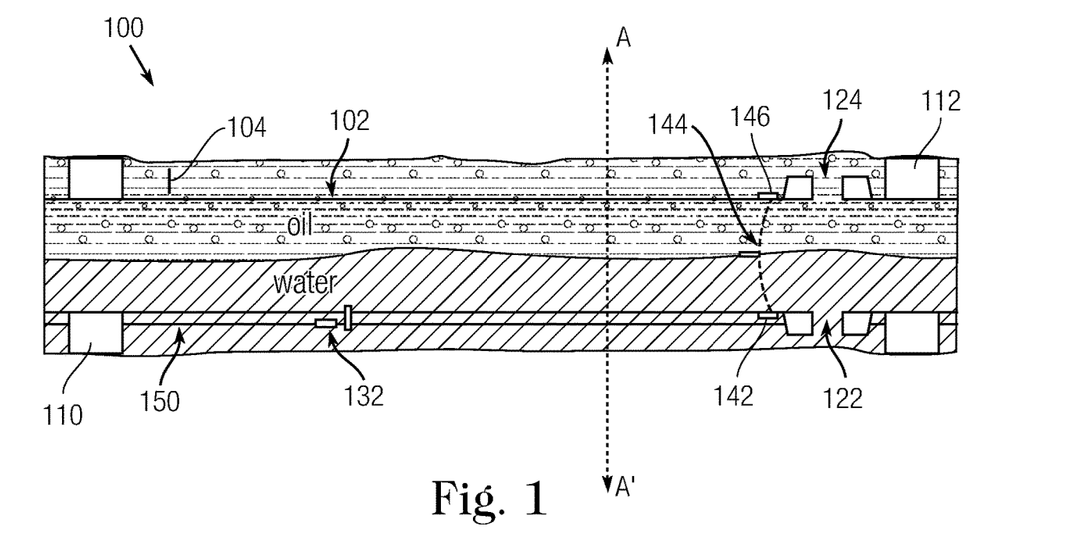
FIG. 1 is a longitudinal cross-section of an embodiment of a system for metering multiphase flow according to the present disclosure.

FIG. 1 is a longitudinal cross-section of an embodiment of a system for metering multiphase flow according to the present disclosure. FIG. 1 shows a horizontal well compartment 100 situated within a geological formation. The compartment includes tubing 102 that runs through the longitudinal extent of the compartment. The tubing 102 is surrounded by an annulus 104 positioned between the tubing and the geological formation through which the horizontal well is constructed. Packers 110, 112 are positioned at the respective left and right ends of the compartment 100 in the annulus 104 to isolate the compartment from other sections of the infrastructure. Inflow ports, e.g., 122, 124 are positioned across the tubing. In the embodiment depicted, the tubing 102 includes four inflow ports (of which two are shown in the cross-sectional view) but in other embodiments, it is possible to use fewer or a larger number of input ports.

Figure 2A:
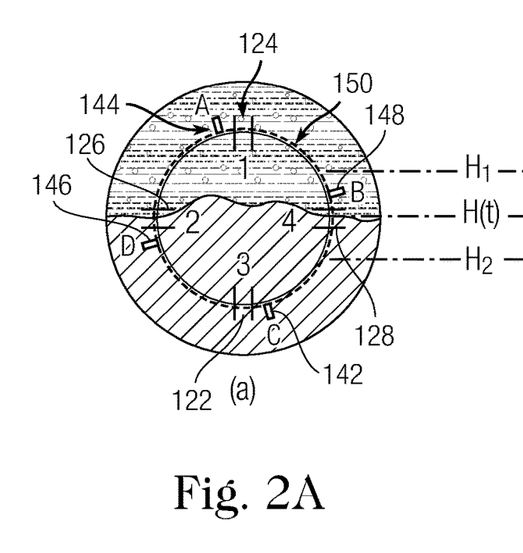
FIGS. 2A and 2B are latitudinal cross-sections of the embodiment of the system for metering multiphase flow taken along axis A-A' shown in FIG. 1.
Figure 2B:
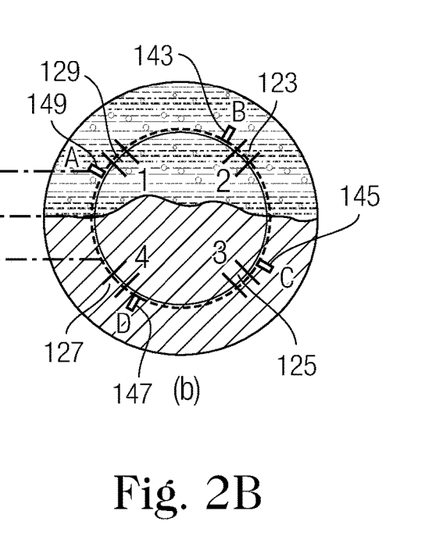

The inflow ports, e.g., 122, 124 can be spaced in an equidistant manner around the circumference of the tubing so that they are 90 apart from each other over a 360 span. This arrangement ensures that at least one inflow port is within one of the two stratified phases at all times. FIG. 2A is a latitudinal cross-sectional view through axis A-A' shown in FIG. 1. In this view, all four inflow ports 122, 124, 126, 128 are shown and their relative spacing is more clearly depicted. Each inflow port 122, 124, 126, 128, includes both an orifice and a control valve. In this arrangement the inflow ports are positioned in approximately up, down, left and right orientations. FIG. 2B shows an alternative configuration in which the inflow ports 123, 125, 127, 129 are offset by 45 degrees with respect to the orientations shown in FIG. 2B. This arrangement represents a worst-case scenario in that the inflow ports are positioned more closely to the interface between oil and water phases. If significant waves form, one or more inflow ports can be submerged in the other phase.

Figure 6:
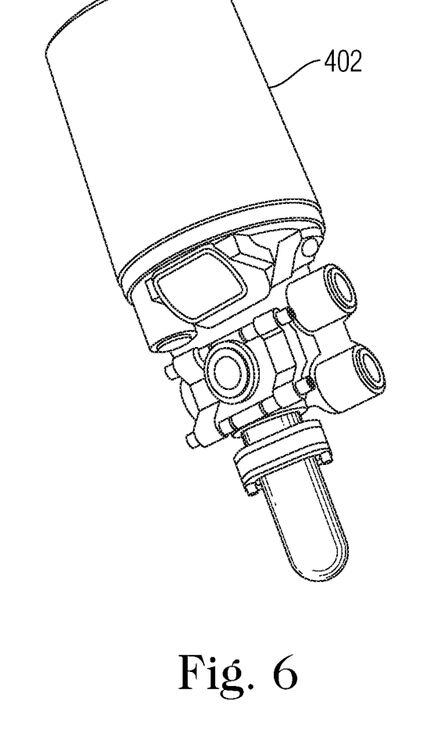
FIG. 6 is a perspective view of an exemplary inflow port control valve that can be used in the disclosed systems for metering multiphase flow.

Each inflow port 122, 124, 126, 128 includes an orifice and a control valve that is adapted to allow or close off flow through the inflow ports based on a control signal received from an electronic control unit. An example control valve 402 that can be used in the present context, shown in FIG. 6, is the 422 Series Shear Seal® solenoid valve manufactured by Barksdale Inc. of Los Angeles, Calif. The control valve is capable of opening and closing (on/off position) repeatedly. The 422 Series has a minimum flow diameter of 5.6 mm, is rated for a working pressure up to 3000 psi and can handle tens of thousands of on-off cycles. Each inflow port also acts as a choke in that there is a measurable pressure drop across the valve from the exterior to the interior of the tubing 102.

Figure 7:
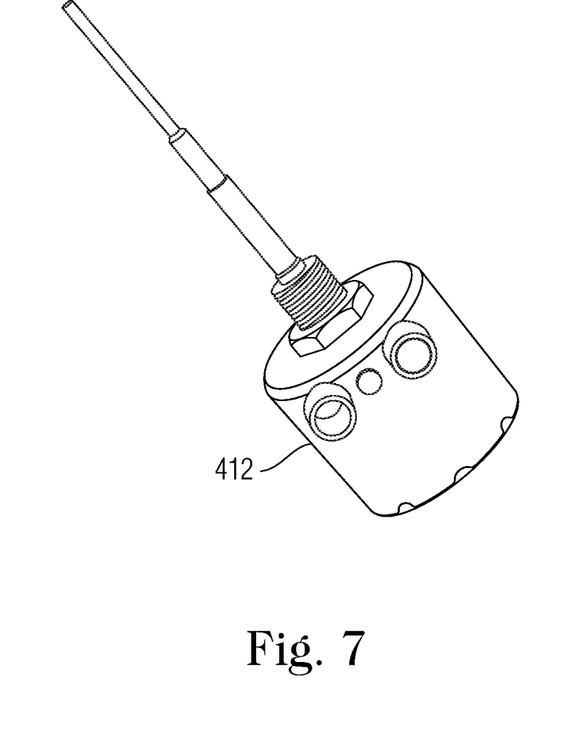
FIG. 7 is a perspective view of an exemplary capacitive level sensor that can be used in the disclosed systems for metering multiphase flow.

Returning to FIG. 1, a differential pressure gauge 132 has a first part positioned in the interior of tubing 102 and another part positioned in the annulus 104 to measure the pressure drop across the inflow ports in one of the phases. A second differential pressure gauge (not shown in FIG. 1) measures the same pressure drop within the second phase. The pressure drop is used to calculate volumetric flow using Bernoulli's principle. A plurality of level sensors 142, 144, 146 are affixed to the external surface of the tubing. The level sensors are adapted to measure the fluid interface level in the annulus. Using a plurality of level sensors positioned around the circumference of the tubing ensures that the interface level between the separate phases present in the annulus can be determined. An example embodiment of a level sensor 412, shown in FIG. 7, is a multiple capacitance sensor manufactured by Omega Engineering, Inc. of Norwalk, Conn.

The control valves, differential pressure gauge and level sensors are provided with electrical power via electrical line 150 that extends through the compartment. Returning to FIGS. 2A and 2B, exemplary arrangements of the level sensors are shown. In the arrangement of FIG. 2A, four level sensors 142, 144, 146 and 148 are positioned adjacent to respective inflow valves 122, 124, 126, 128. Similarly, in the arrangement of FIG. 2B, in which the inflow valves are rotated 45° with respect to the vertical and horizontal axes, level sensors 143, 145, 147 and 149 are positioned adjacent inflow valves 122, 124, 126, 128. Each of level sensors and their respective positions can be uniquely identified by the electronic control unit. In the example shown in FIG. 2B, the interface level is determined to be between the height of level sensors 145, which is higher than level sensor 147 but still submerged in water, and level sensor 149, which is lower than level sensor 143 but still submerged in oil.

Figure 3:
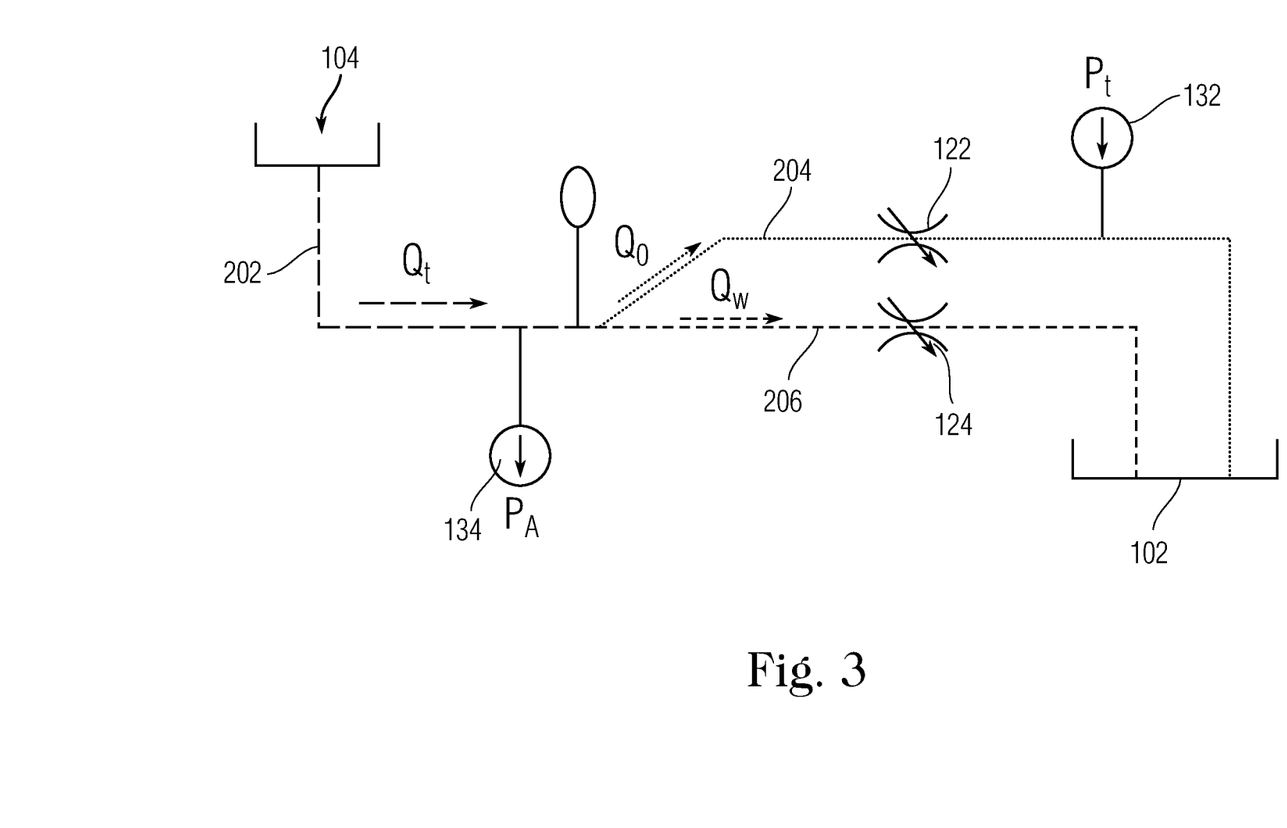
FIG. 3 is a schematic diagram fluid flow path from the annulus into the tubing. in embodiments of the disclosed system for metering multiphase flow.

FIG. 3 is a schematic diagram of a fluid flow path from the annulus 104 into the tubing 12. Oil and water in the annulus flowing in path 202 stratify, with oil being directed through a top flow segment 204 and water through a bottom flow segment 206. Oil in flow segment 204 flows through an inflow port (and control valve) 122, located at first position into the tubing 102. Water in flow segment 206 flows through a second inflow port (and control valve) 124, located at a lower position that the first control valve into the tubing as well. The first control valve 122 thereby controls the inflow of oil (alone) into the tubing and the second control valve 124 only controls the inflow of water, and aids in maintaining stratification of the phases. A first pressure gauge 132 measures the pressure drop across the first inflow port 122 (between the annulus and the interior of the tubing) and a second pressure gauge 134 measures the pressure drop across the second inflow port 124 (also between the annulus and the interior of the tubing).

As shown in FIG. 1, flows of oil and water are stratified, with oil flowing in a lop layer and water flowing in a bottom layer and an interface where the layers of the two phases meet. In some cases, the two phases flow into the compartment separately in an unmixed state. An electronic control unit (not shown) coupled to the control valves implements a method for maintaining the height, H(t), of the interface between the oil and water phases as part of the method of metering multiphase flow according to the present disclosure. The electronic control unit (not shown in FIG. 1) can be a processor that is operative to execute accessible stored program instructions, or it can be a programmable logic unit or application-specific circuit that automatically responds to received signals to implement the control method. In some embodiments, the control unit is positioned in a surface facility and sends and receives electrical signals to the components of the apparatus over conductive line 150. The control algorithm defines a top threshold, $H_1$, which is the highest level at which the interface can be allowed to rise, and a low threshold, $H_2$, which is the lowest level at which the interface can be allowed to fall. The control algorithm operates to maintain the interface level between $H_1$ and $H_2$.

Figure 5:
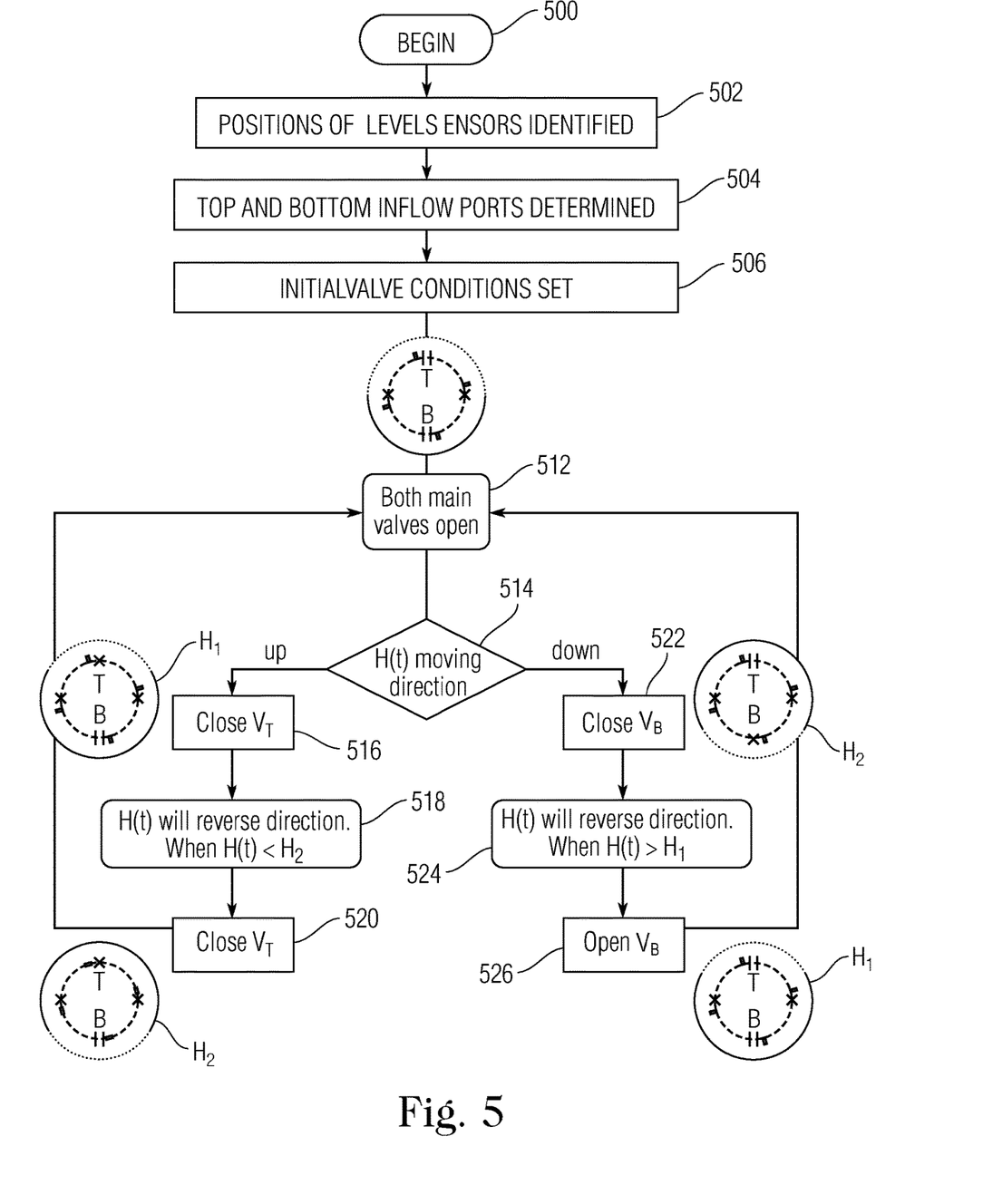
FIG. 5 is a flow chart of an embodiment of a method of controlling valve of the system for metering multiphase flow to maintain an interface level according to the present disclosure.

FIG. 5 is a flow diagram of an embodiment of a method for metering multiphase flow according to the present disclosure. In step 500, the method begins. In step 502, the positions of the level sensors are identified; in the following step 504, from the identification of the level sensors, the control unit identifies the inflow ports (associated with the level sensors) that are positioned at the top and bottom of the tubing, which are designated as the main inflow ports, and the other ports ("back-up" inflow ports) that are positioned nearer to the fluid interface (as per the arrangement of FIG. 2A). In step 506, the control unit sets the valve conditions for initial metering by shutting the control valves of the back-up inflow ports and leaving the control valves, $V_t$ and $V_b$ of the main inflow ports open. After initialization, the control valves are operated to maintain the interface level H(t) between minimum and maximum thresholds.

In step 512, starting from the condition in which both main valves are open, readings are obtained from the level sensors to determine an initial interface level H(t). In step 514, new level sensor readings are obtained, and from the new readings, the direction in which H(t) has changed (if at all) is determined. If, in step 514, it is determined that H(t) is moving up, in step 516, the top inflow valve $V_t$ is closed. Following this flow path, in step 518, it is determined whether H(t) has reached the bottom threshold height $H_2$. When H(t) reaches $H_2$, valve $V_t$ is opened in step 520. Thereafter, the process cycles back to step 512. Returning to step 514, if is determined that H(t) is moving down, in step 522, the bottom inflow valve $V_b$ is closed. In this flow path, in step 524, it is determined whether H(t) has reached the top threshold height $H_1$. When H(t) reaches $H_1$, valve $V_b$ is opened in step 526. Thereafter, the process cycled back to step 512. This flow provides for continuous monitoring and control over the fluid interface level between the phases in the horizontal compartment.

With the ability to have single phase flow through each valve, the oil flow rates through the orifice is calculated as follows:

$$Q_o = Q_{V_T} = \int Q(t)_{V_T} \tag{1}$$

in which t represents time, $Q_o$ represents the oil flow rate, and $Q_{V_T}$ represents the flow rate through the top main inflow port as a function of time. These two values are equal since oil always flows from the top port. The $Q_{V_T}$ term can be calculated as:

$$Q(t)_{V_T} = 0 \text{ if } V_T \text{ is closed} \tag{2}$$

$$C_{V_T}\sqrt{\frac{\Delta p}{\rho_o}} \text{ if } V_T \text{ is open} \quad (3)$$

in which $C_{V_T}$ represents the top valve coefficient, $\Delta p$ represents the measured pressure drop between the annulus and the tubing, and $\rho_o$ represents the oil density.

Similarly, the water flow rate through the orifice is determined as:

$$Q_w = Q_{V_B} = f_t Q(t)_{V_B} \quad (4)$$

in which $Q_w$ is the water flow rate and $Q_{V_B}$ is the rate of water flow through the bottom main inflow port. These two values are equal since water always flows from the bottom port. The $Q(t)_{V_B}$ can be calculated as:

$$Q(t)_{V_B} = 0 \text{ if } V_B \text{ is closed} \quad (5)$$

$$\left[ C_{V_B}\sqrt{\frac{\Delta p}{\rho_w}} \text{ if } V_B \text{ is open} \right. \quad (6)$$

in which $C_{V_B}$ is the bottom valve coefficient, $\Delta p$ is the pressure drop between the annulus and the tubing, and $\rho_w$ is the water density.

The two-phase flow measurement can be fully determined by defining the total flow, $Q_t$, and water cut, WC, as:

$$Q_t = Q_w + Q_o \quad (7)$$

$$WC = \frac{Q_w}{Q_t} \quad (8)$$

According to the disclosed method, the rate of oil flow ($Q_{VT}$) and the rate of water flow ($Q_{VB}$) can be separately determined from the known characteristics of the valves ($C_{VT}$, $C_{VB}$), the measured pressure drop between the annulus and the inside of the tubing, and the densities of oil and water. Similarly, the total flow and water cut are easily determined from the oil flow and water flow. Complex calculations that are required for mixed flows are not necessary and determinations of flow characteristics is straightforward.

The system and methods disclosed above can be used for separating fluids have more than two phases. For example, three or more fluids can be separated if there is an adjustable orifice for each distinct phase.

It is to be understood that any structural and functional details disclosed herein are not to be interpreted as limiting the systems and methods, but rather are provided as a representative embodiment and/or arrangement for teaching one skilled in the art one or more ways to implement the methods.

It is to be further understood that like numerals in the drawings represent like elements through the several figures, and that not all components and/or steps described and illustrated with reference to the figures are required for all embodiments or arrangements.

The terminology used herein is for the purpose of describing particular embodiments only and is not intended to be limiting of the disclosure or the invention described herein. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing and are not to be construed as limiting. However, it is recognized these terms could be used with reference to a viewer. Accordingly, no limitations are implied or to be inferred.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

While the disclosure has been described with reference to exemplary embodiments, it will be understood by those skilled in the art that various changes may be made and equivalents may be substituted for elements thereof without departing from the scope of the disclosure. In addition, many modifications will be appreciated by those skilled in the art to adapt a particular instrument, situation or material to the teachings of the disclosure without departing from the essential scope thereof. Therefore, it is intended that the invention not be limited to the particular embodiment disclosed as the best mode contemplated for carrying out this disclosure, but that the invention will include all embodiments falling within the scope of the disclosure as understood by one of ordinary skill in the art.

What is claimed is:

1. A method of measuring two or more fluid phases in a downhole well bore comprising:
   receiving a stratified flow of the two or more fluid phases via respective ports;
   immersing two or more level sensors within each of the two more fluid phases;
   maintaining a level of an interface between the two or more phases in a range by operation of valves at the respective ports to ensure that at least one port is within one of the two or more stratified fluid phases; and
   measuring the stratified flow of each of the two or more phases at the respective ports at which the two or more phases are unmixed within the well bore.

2. The method of claim 1, wherein the well bore is inclined at 20 degrees or less to a horizontal axis.

3. The method of claim 1, wherein each of the two or more phases flow at a rate to achieve low Reynolds numbers in a laminar or near laminar flow regime.

4. The method of claim 1, wherein the two or more phases mix downstream from the respective ports.

5. The method of claim 1, further comprising measuring pressure of the two or more phases across the respective ports.

6. The method of claim 1, further comprising controlling the opening of the valves to maintain separation of the two or more flowing phases during an entire production period.

7. The method of claim 6, further comprising determining a flow rate of the two or more phases based on pressure at the respective ports according to the equation:

$$Q_i = C_{V_i}\sqrt{\frac{\Delta p}{\rho_i}}$$

In which Qi is the flow rate of the ith phase, $C_{vi}$ is a coefficient related to the properties of the variable valve of the ith valve, $\Delta p$ is a pressure differential measured at the ith port, $\rho_i$ is the density of the ith phase, and in which the two or more phases number 1 to i.

8. A system for measuring two or more fluid phases in a downhole well bore comprising: a tube within the well bore having two or more ports equipped with valves, each port for receiving a stratified flow of the two or more fluid phases, respectively; two or more fluid measurement sensors for measuring a parameter indicative of flow in each one of the two or more phases at respective ports at which the two or more phases are unmixed within the well bore; two or more level sensors, one of the two or more level sensors being immersed in each one of the respective two or more phases; and an electronic control unit communicatively coupled to the two or more fluid measurements sensors and the two or more level sensors and configured to control the valves of the two or more ports based on data received from the two or more level sensors to maintain a level of an interface between the two or more phases in a range by operation of valves at the respective ports to ensure that at least one port is within one of the two or more stratified fluid phases.

9. The system of claim 8, wherein the well bore is inclined at 20 degrees or less to a horizontal axis.

10. The system of claim 9, wherein the inclination of the well bore and control of the port valves cause the flow of each of the two or more phases to have low Reynolds numbers in a laminar or near laminar flow regime.

11. The system of claim 8, wherein the two or more phases mix downstream from the respective ports.

12. The method of claim 8, wherein the plurality of flow measurement sensors include pressure sensors.

13. The system of claim 12, wherein one of the pressure sensors is positioned at one of the two or more ports of the tube, and another of the pressure sensors is positioned in an annulus surrounding the tube within the well bore, the pressure sensors together measuring a pressure drop between the annulus and the tube, across the ports of the tube.

* * * * *